United States Patent [19]

Wu et al.

[11] Patent Number: 5,771,234
[45] Date of Patent: Jun. 23, 1998

[54] METHOD AND SYSTEM FOR ATM CELL MULTIPLEXING UNDER CONSTANT BIT RATE, VARIABLE BIT RATE AND BEST-EFFORT TRAFFIC

[75] Inventors: Chiung-Shien Wu, Kaouhsiung; Gin-Kou Ma, Hsinchu, both of Taiwan

[73] Assignee: Industrial Technology Research Institute, Hsinchu, Taiwan

[21] Appl. No.: 568,413

[22] Filed: Dec. 6, 1995

[51] Int. Cl.$^6$ .............................. H04J 3/22; H04L 12/54
[52] U.S. Cl. ...................... 370/396; 370/418; 370/455; 370/459; 370/461
[58] Field of Search ................................. 370/230, 231, 370/232, 233, 235, 389, 391, 395, 396, 412, 418, 450, 451, 452, 454, 455, 458, 459, 460, 461, 462, 538

[56] References Cited

U.S. PATENT DOCUMENTS

| | | | |
|---|---|---|---|
| 4,984,264 | 1/1991 | Katsube | 379/197 |
| 5,150,358 | 9/1992 | Puni et al. | 370/418 |
| 5,179,551 | 1/1993 | Turner | 370/398 |
| 5,179,556 | 1/1993 | Turner | 370/233 |
| 5,210,743 | 5/1993 | Eilenberger et al. | 370/422 |
| 5,229,990 | 7/1993 | Teraslinna | 370/218 |
| 5,251,205 | 10/1993 | Calon et al. | 370/392 |
| 5,271,003 | 12/1993 | Lee et al. | 370/221 |
| 5,274,360 | 12/1993 | Watanabe et al. | 340/686 |
| 5,280,480 | 1/1994 | Pitt et al. | 370/256 |
| 5,287,347 | 2/1994 | Spanke | 370/389 |
| 5,291,477 | 3/1994 | Liew | 370/238 |
| 5,295,137 | 3/1994 | Jurkevich | 370/389 |
| 5,307,413 | 4/1994 | Denzer | 380/49 |
| 5,311,513 | 5/1994 | Ahmadi et al. | 370/230 |
| 5,327,552 | 7/1994 | Liew | 395/182.01 |
| 5,335,269 | 8/1994 | Steinlicht | 379/266 |
| 5,341,366 | 8/1994 | Soumiya et al. | 370/233 |
| 5,359,538 | 10/1994 | Hui et al. | 364/491 |
| 5,369,707 | 11/1994 | Follendore, III | 380/25 |
| 5,381,407 | 1/1995 | Chao | 370/233 |
| 5,420,857 | 5/1995 | Jurkevich | 370/409 |
| 5,421,031 | 5/1995 | De Bay | 455/5.1 |
| 5,452,350 | 9/1995 | Reynolds et al. | 379/220 |

(List continued on next page.)

OTHER PUBLICATIONS

Thomas D. Ndousee: *Fuzzy Neural Control of Voice Cells in ATM Networks*, IEEE Journal on Selected Areas in Communications, vol. 12, No. 9, Dec., 1994, pp. 1488–1494.

Roch Guerin, Hamid Ahmadi, and Mahmoud Naghshineh, *Equivalent Capacity and Its Application to Bandwidth Allocation in High–Speed Networks*, IEEE Journal on Selected Areas in Communications, vol. 9, No. 7, Sep., 1991, pp. 968–981.

(List continued on next page.)

*Primary Examiner*—Alpus H. Hsu
*Attorney, Agent, or Firm*—Meltzer, Lippe, Goldstein, Wolf, & Schlissel, P.C.

[57] ABSTRACT

A method and system are disclosed for scheduling the assignment and writing of cells from cell sources into a outgoing bitstream transmitted from each device of an ATM communications network. The timeslots are organized into fixed length cycles which cycles each have a sequence of N timeslots, where N is an integer >1. Furthermore, each cycle is divided into at least one round comprising a variable length subsequence of the timeslots of the cycle. During each timeslot of a uniform timeslot clock, at least one subset of the sources is identified. Each subset corresponds to a round. One cell from each subset is assigned to, and written into, a respective timeslot of the corresponding round. During each timeslot of the timeslot clock, each of the sources is assigned a priority state depending on how many cells of that source have been previously assigned to timeslots during the current cycle and whether or not that source has a cell available for assignment to a round during that timeslot. The highest priority state assigned to any source during each timeslot is identified. One of the cells of each source with the identified highest priority state are assigned to, and written into, a timeslot of a corresponding round, in a round-robin fashion, to form the subsequence of cells of that round.

14 Claims, 6 Drawing Sheets

U.S. PATENT DOCUMENTS

| | | | |
|---|---|---|---|
| 5,459,716 | 10/1995 | Fahim et al. | 370/228 |
| 5,461,615 | 10/1995 | Henrion | 370/355 |
| 5,463,616 | 10/1995 | Kruse et al. | 370/276 |
| 5,475,831 | 12/1995 | Yoshida et al. | 395/500 |
| 5,483,461 | 1/1996 | Lee et al. | 364/490 |
| 5,487,170 | 1/1996 | Bass et al. | 3780/461 |
| 5,500,858 | 3/1996 | McKeown | 370/412 |

OTHER PUBLICATIONS

San–qi Li and Song Chong, Fundamental Limits of Input Rate Control in High Speed Network, Dept. of Electrical and Computer Eng'g, University of Texas at Austin, pp. 662–671.

Allen R. Bonde, Jr. and Sumit Ghosh, *A Comparative Study of Fuzzy Versus "Fixed" Thresholds for Robust Queue Management in Cell–Switching Networks,* IEEE/ACM Transactions on Networking, vol. 2, No. 4, Aug., 1994, pp. 337–344.

A. Hiramatsu, *ATM Communications Network Control by Neural Networks,* IEEE Trans. on Neural Nets., vol. 1, No. 1, pp. 122–130 (1990).

M. De Pryker, Asynchronous Transfer Mode Solution for Broadband ISDN, 2d ed., ch. 2.4.5.4, pp. 84–87 (1995).

Siemens Aktiengessellschaft, Telephone Traffic Theory Tables and Charts Part 1, p. 17, 29 (1970).

METHOD AND SYSTEM FOR ATM CELL MULTIPLEXING UNDER CONSTANT BIT RATE, VARIABLE BIT RATE AND BEST-EFFORT TRAFFIC

FIELD OF THE INVENTION

The present invention relates to a communication system in which information is transmitted in a bitstream. The bitstream is organized into fixed length cells which are transmitted in timeslots of the bitstream. Cells from multiple sources are multiplexed into the bitstream. However, the cells are not allocated to timeslots in a fixed manner. Rather, each timeslot is dynamically allocated to the cells of the respective sources. Some sources have a variable bit rate. Other sources have a constant bit rate. Even other sources have no bit rate requirement and get the best service available. The present invention is directed to a method and system for scheduling the allocation of timeslots to cell sources with different cell production characteristics so as to guarantee respective throughputs or quality of services to each source.

BACKGROUND OF THE INVENTION

FIG. 1 depicts a communications network 10. The communications network may be a telephone network, a cable television network, a computer network, etc. For purposes of illustration, assume that the communications network 10 is a telephone network. The communications network 10 includes multiple customer premises equipments (CPE) 11, 13, 15, 17, and 19 such as telephones, private branch exchanges (PBX's), set-top boxes, file server routers, computers with modem cards, etc. Each Cp E 11–19 is connected to a multiplexer 21 or 23. The multiplexer 21 or 23 may form part of a concentrator, central office, cable head end, router or satellite transponder of the communications network 10. The multiplexers 21 and 23 may be connected to one or more switches 31, 32, 33, which may be central offices or routers. The switches 31, 32, 33 may be connected to each other via a hub 41 which may form part of a toll office or router.

Illustratively, communication is achieved in the communication network 10 according to Asynchronous Transfer Mode or (ATM). See M. DEPRYCKER, ASYNCHRONOUS TRANSFER MODE SOLUTION FOR BROADBAND ISDN, 2d ed., ch.3 (1995). According to ATM, a bitstream is transmitted via links, i.e., optical fibers, unshielded twisted pairs of wires, coaxial cables, etc. which interconnect the CPEs 11–19, multiplexers 21, 23, switches 31–33 and hub 41. The bitstream is illustratively organized into fixed length timeslots. Fixed length cells which carry overhead and information data are written into, and read from, the timeslots of the bitstream by the CPEs 11–19, multiplexers 21, 23, switches 31–33 and hub 41. FIG. 2 shows an illustrative cell 60. The cell 60 has a fixed length header portion 62 and a fixed length payload portion 64. The header portion 62 contains various overhead control information, such as information for routing the cell through the communications network 10. The payload portion 64 contains information, such as a message, to be conveyed.

Communication is achieved, for instance between the nodes 11 and 19, by transmitting cells that contain messages along a virtual path. The virtual path comprises a definite sequence of the devices 11–19, 21, 23, 31–33 and 41. This sequence of devices is illustratively predefined during a set up procedure when the communication is initiated. For example, to enable communication between the CPE 11 and the CPE 19, a virtual path may be set up from the CPE 11 to the CPE 19 as follows:

CPE 11→multiplexer 21→switch 31→switch 32→hub 41→switch 33 →multiplexer 23→CPE 19.

Likewise, a return virtual path may be set up from the CPE 19 to the CPE 11 as follows:

CPE 19→multiplexer 23→switch 33→hub 41→switch 31→multiplexer 21→CPE 11.

A virtual channel (VC) is defined as a communication channel that is dynamically allocated by a device for transmitting cells of a particular communication to a second device. The collection of all virtual channels of a virtual path is referred to as a virtual channel connection (VCC). In setting up a virtual path, a VCC identifier is assigned to the communication. Each device on the virtual path (e.g., switch 32) allocates a virtual channel to the device to which it transmits cells for the communication, i.e., the very next device on the virtual path (e.g., the hub 41). Each device on the virtual path creates an entry in a routing table for each communication. Each entry is indexed by the VCC identifier of the respective communication and contains information regarding how to transmit received cells to the next device on the virtual path. For instance, the indexed routing table entry may contain an indication of the virtual channel for routing the cell, or an output port connected, to the very next device on the virtual path. Once the virtual path is set up, the communicating device, e.g., the CPE 11, generates one or more cells 60. The CPE 11 writes the VCC identifier assigned to the communication in the cell headers 62 and the messages to be transmitted in the cell payloads 64. The CPE 11 then transmits the generated cells 60 to the next device (multiplexer 21) on the virtual path to the destination using the above-described routing table lookup process. Each intermediate device, e.g., the multiplexer 21, which receives a cell utilizes the VCC identifier in the cell to access the routing table thereat. The intermediate device utilizes the retrieved entry to transmit the cell on the appropriate virtual channel to the next device (e.g., the switch 31) on the path to CPE 19. This process is repeated at each intermediate device (i.e., the switch 31, switch 32, hub 41, switch 33, and multiplexer 23) until the cell arrives at its destination.

Each bitstream to be transmitted from the devices 11–19, 21, 23, 31–33 and 41 contains a sequence of cells from one or more distinct communications. The maximum number of cells which can be transmitted in a bitstream at any one time is fixed. The bitstreams transmitted on each link need not have the same bandwidth. For instance, the bitstream transmitted on the link between the multiplexer 21 and the switch 31 may be an OC-3 SONET link with a bandwidth of 155 Mbit/sec. The bitstream transmitted on the link between the switch 31 and the hub 41 may be an OC-12 SONET link with a bandwidth of 620 Mbit/sec.

There are two possibilities for multiplexing one bitstream into another bitstream. In physical multiplexing, multiple lower rate bitstreams are simply combined into a higher rate bitstream or a higher rate bitstream is split into multiple lower rate bitstreams. Such physical layer multiplexing does not involve adding (i.e., writing) cells to, or dropping (i.e., reading) cells from, one or more of the bitstreams. Rather, physical layer multiplexing is plainly directed to aggregating bandwidth. Thus, physical layer multiplexing can be easily implemented by assigning slots in the higher bit rate bitstream to the lower bit rate signals in a round robin fashion. Likewise, the higher bit rate bitstream is divided into multiple lower rate bitstreams by sequentially transferring cells of the higher rate bitstream to the lower rate bitstreams in a round robin fashion.

Cell layer multiplexing, on the other hand, is directed to selectively reading, i.e., dropping, cells from a bitstream and selectively writing, i.e., adding, cells to a bitstream. Cell layer multiplexing is utilized at each device 11–19, 21, 23, 31–33 and 41 in reading received cells received from an incoming bitstream and writing the received cells in an outgoing bitstream to the next device on the virtual path.

In ATM, the number of timeslots of outgoing bitstreams which the devices 11–19, 21, 23, 31–33 or 41 allocate to each virtual channel varies over time depending on the instantaneous load at that moment at the device. This complicates the cell layer multiplexing. Consider that at any given moment, the volume of cell traffic can be very high. Furthermore, some cells can tolerate some delay while others cannot. In scheduling cells for writing into the bitstream, the devices 11–19, 21, 23, 31–33 and 41 must ensure that cells from each communication are scheduled frequently enough per unit of time to maintain their respective throughputs or quality of services. The devices should also ensure that at least some cells are scheduled for each communication periodically.

FIG. 3 depicts a prior art cell scheduling process referred to as Weighted Round-Robin or "WRR" for short. For purpose of convenience, any hardware in the devices 11–19, 21, 23, 31–33 and 41 that produces cells for writing into an outgoing bitstream is referred to as a cell source. Note that the definition of cell source includes both hardware that generates new cells and hardware that simply receives cells from another device (i.e., demultiplexes cells from a bitstream by reading them) which cells must be written into an outgoing bitstream. According to WRR, the timeslots of the bitstream are divided into cycles which cycles each contain a fixed length number of sequential timeslots N (where N is an integer >1). Each cycle is further divided into one or more "rounds" containing a variable length subsequence of timeslots of the cycle. A subset of one or more cell sources "are visited" each round. That is, a subset of the cell sources is selected each round. One cell is assigned to a respective timeslot from each selected cell source in a round robin fashion.

The decision of which cell sources are visited is made according to a fixed predetermined weighing. For instance, consider the case where there are five sources a,b,c,d and e. The source a illustratively is assigned the weight 5. The source b illustratively is assigned the weight 3. The source c illustratively is assigned the weight 2. Both the sources d and e illustratively are assigned the weight 1. The weights indicate the number of cells from each cell source which are to be assigned to timeslots during each cycle. On the first round, each of the sources are visited in a round-robin fashion. One cell is sequentially assigned to a timeslot from each source a,b,c,d and e. Thus, five cells are assigned in round 1, namely, $a_1$, $b_1$, $c_1$, $d_1$, and $e_1$. On round two, only the sources a,b and c are visited in a round robin fashion. Thus, three cells are sequentially assigned to time slots, namely, $a_2$, $b_2$ and $c_2$. On round three, only the sources a and b are visited, resulting in two cells being assigned to timeslots, namely, $a_3$ and $b_3$. On each of the rounds four and five only the source a is visited, resulting in one cell being assigned to a time slot. In round four, $a_4$ is assigned to a timeslot and in round five, $a_5$ is assigned to a timeslot.

Consider now the cell production characteristics of different types of cell sources which are intended to be accommodated by the ATM communications system 10. Some sources are best effort sources. An example of a best effort source is a source which produces cells containing transactional data, such as data for a computer application. Such data need not necessarily be produced at any specific bit rate. Thus, cells produced from best effort sources are provided the best available service. Generally speaking, cells from best effort sources are written into timeslots as they are available.

The communications network 10 may also have constant bit rate sources. Examples of such sources are sources which produce cells containing interactive voice or audio data. As the name suggests, such sources produce cells at a constant mean rate. Furthermore, constant bit rate sources must be written into timeslots approximately at the rate they are produced. (Generally speaking, the destination has a buffer for receiving the data contained in the cells produced at the constant bit rate source. This provides a tolerance for slight fluctuation in the data rate.) If such cells are not transmitted timely, the communications may be highly degraded. For instance, if cells are delayed, long pauses may be experienced at the destination end of an interactive communication thereby making it difficult for two users to converse. Alternatively, detectable gaps may be produced at the destination end of the communication which render it unnatural, at best, or unintelligible, at worst.

In addition, the network 10 may have variable bit rate sources. An example of a variable bit rate source is a source which produces cells containing compressed video. Variable bit rate sources produce cells at a varying rate over each unit of time (such as a cycle). Over very long periods of time (many cycles) variable bit rate sources produce cells at a nominal mean rate. However, during any one of those units of time, a variable bit rate source can produce cells at a higher peak rate. Like constant bit rate sources, the cells produced by variable bit rate sources must be written into timeslots approximately at the same rate they are produced.

A disadvantage of the WRR process is the fixed weighing. Specifically, the number of cells to be assigned to, and written into, timeslots of the outgoing bitstream is the same every cycle. However, not all sources produce cells at a constant rate. The inflexibility of the WRR process increases the buffer size requirement at each device 11–19, 21, 23, 31–33 and 41 which buffer ensures that each source can maintain its respective quality of service.

It is therefore an object of the invention to overcome the disadvantages of the prior art.

SUMMARY OF THE INVENTION

This and other objects are achieved by the present invention. Illustratively, the invention is directed to a communications network environment wherein communication is achieved by transmitting a bitstream that is organized into fixed length time slots. Fixed length cells containing communicated messages are written into, and read from, the time slots of the bitstream. Various devices of the communications network, such as file servers, multiplexers, switches and hubs perform cell layer multiplexing. That is, cells may be added to (written into timeslots of), or dropped from (read out from timeslots of), different bitstreams in order to achieve communication.

According to the invention, a dynamically weighted round-robin process is used to schedule the assignment and writing of cells from cell sources into the outgoing bitstream transmitted from each device of the communications network. As in the conventional WRR process, the timeslots are organized into fixed length cycles which cycles each have a sequence of N timeslots, where N is an integer >1. Furthermore, each cycle is divided into at least one round comprising a variable length subsequence of the timeslots of the cycle. During each timeslot of a uniform timeslot clock, at least one subset of the sources is identified. Each subset corresponds to a round. One cell from each subset is assigned to, and written into, a respective timeslot of the corresponding round.

Unlike the conventional WRR process, the cell sources of the subset are not selected according to a fixed, predetermined weighing. Rather, during each timeslot of the uniform timeslot clock, each of the sources is assigned a priority state depending on how many cells of that source have been previously assigned to timeslots during the current cycle and whether or not that source has a cell available for assignment to a round during that timeslot. The highest priority state assigned to any source during each timeslot is identified. One of the cells of each source with the identified highest priority state are assigned to, and written into, a timeslot of a corresponding round, in a round-robin fashion, to form the subsequence of cells of that round.

For example, each variable bit rate source has a predefined peak number of cells, and a predefined mean number of cells, that can be produced in a single cycle. During each timeslot of the timeslot clock, priority states are assigned to variable bit rate sources as follows. If the variable bit rate source has a cell available to be assigned to a timeslot, and less than its mean number of cells have been previously assigned to timeslots during the current cycle, the variable bit rate source is assigned a first, highest priority state. If the variable bit rate source has a cell available to be assigned to a timeslot, and more than its mean number of cells, but less than its peak number of cells, have been previously assigned to timeslots during the current cycle, the variable bit rate source is assigned a second priority state that is lower than the first priority state. In all other cases (no cell available for assignment this timeslot or more than the peak number of cells assigned), the variable bit rate source is not permitted to provide cells for assignment to, and writing into, timeslots during the remainder of the current cycle.

Each constant bit rate source has only a mean number of cells that can be produced each cycle. If the constant bit rate source has a cell available to be assigned to a timeslot, and less than its mean number of cells have been previously assigned to timeslots during the current cycle, the constant bit rate source is assigned a first, highest priority state. Otherwise (no cell available for assignment this timeslot or more than the mean number of cells assigned), the constant bit rate source is not permitted to provide cells for assignment to, or writing into, timeslots during the remainder of the current cycle.

In any timeslot during which no variable bit rate or constant bit rate sources can provide cells for assignment to, or writing into, timeslots, one best effort source is selected and one cell from the selected best effort source is assigned to, and written into, a timeslot. This single cell forms an entire round. The best effort source is selected from amongst all of the best effort sources in a round-robin fashion.

According to another embodiment, a processor is provided for scheduling cells for transmission in an ATM communications network. The processor may be contained in a file server, multiplexer, switch, hub, etc. of the communications network. The processor, during each timeslot of a timeslot clock, assigns one of plural priority states to a cell source depending on the number of cells of the cell source previously assigned to timeslots in a current cycle, and whether or not the cell source has a cell available for assignment. If the source has been assigned the highest priority state that timeslot, the processor selects one cell from the source. The processor assigns the selected cell of the source to a timeslot of the current round. The assignment is made such that selected cells of one or more sources are assigned in a round robin fashion to form a subsequence of cells of the current round.

Illustratively, each processor includes at least one cell input unit. The cell input unit has a first FIFO for receiving each cell from a cell source. A first token generator is provided for detecting whether or not the first FIFO is empty. The first token generator generates a first token if the first FIFO is not empty and if less than a peak number of cells of the cell source have been previously assigned to a timeslot during a current cycle. The cell input unit also has a first switch, responsive to the first token and a timeslot clock, for outputting a cell from the FIFO depending on the first token. A second FIFO is provided for receiving each cell outputted by the first switch. The cell input unit has a second token generator for detecting whether or not the second FIFO is empty. The second token generator generates a second token if the second FIFO is not empty and if less than a mean number of cells of the cell source have been previously assigned to a timeslot during the current cycle. Furthermore, the cell input unit includes a second switch responsive to the timeslot clock. The second switch outputs a cell from the second FIFO via a first output in response to receiving the second token and outputs the cell from the second FIFO via a second output otherwise.

Illustratively, the processor includes J>1 cell input units, including one cell input unit for each cell source. A delay circuit is illustratively provided for producing a delayed timeslot clock for each of the cell input units. A $j^{th}$ cell input unit, for j=1 to J, receives a timeslot clock that is delayed by j−1 periods. Each cell input unit includes a first output FIFO connected to the first outputs of each of the J cell input units. The processor also includes a second output FIFO connected to the second outputs of each of the J subprocessors. A priority circuit is provided for selecting the cells stored in the first output FIFO if the first output FIFO is not empty and for selecting the cells stored in the second FIFO if the first output FIFO is empty.

In short, a dynamically weighted round robin process and apparatus for scheduling cells of multiple communications for transmission in an ATM communication system is disclosed. Each cell source is assigned a priority each timeslot of a timeslot clock, which priority varies dynamically depending on a number of factors. The invention ensures greater fairness of scheduling amongst all sources while meeting the quality of service requirements of variable bit rate, constant bit rate and best effort sources. The improvement in fairness allows for dramatic reduction in buffer size requirements at each device.

DETAILED DESCRIPTION OF THE INVENTION

Figure 1:
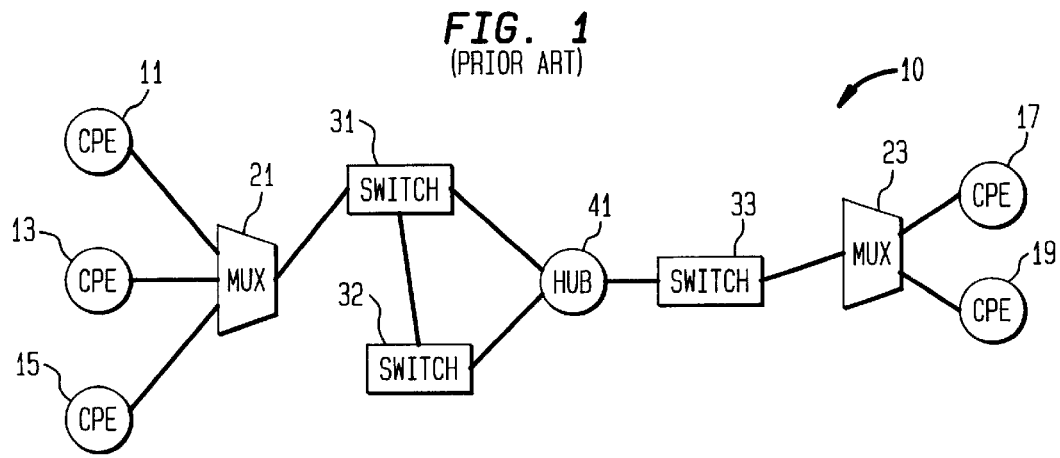
FIG. 1 depicts a conventional communications system.
Figure 2:
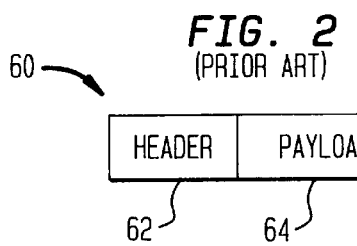
FIG. 2 depicts a conventional cell.
Figure 3:
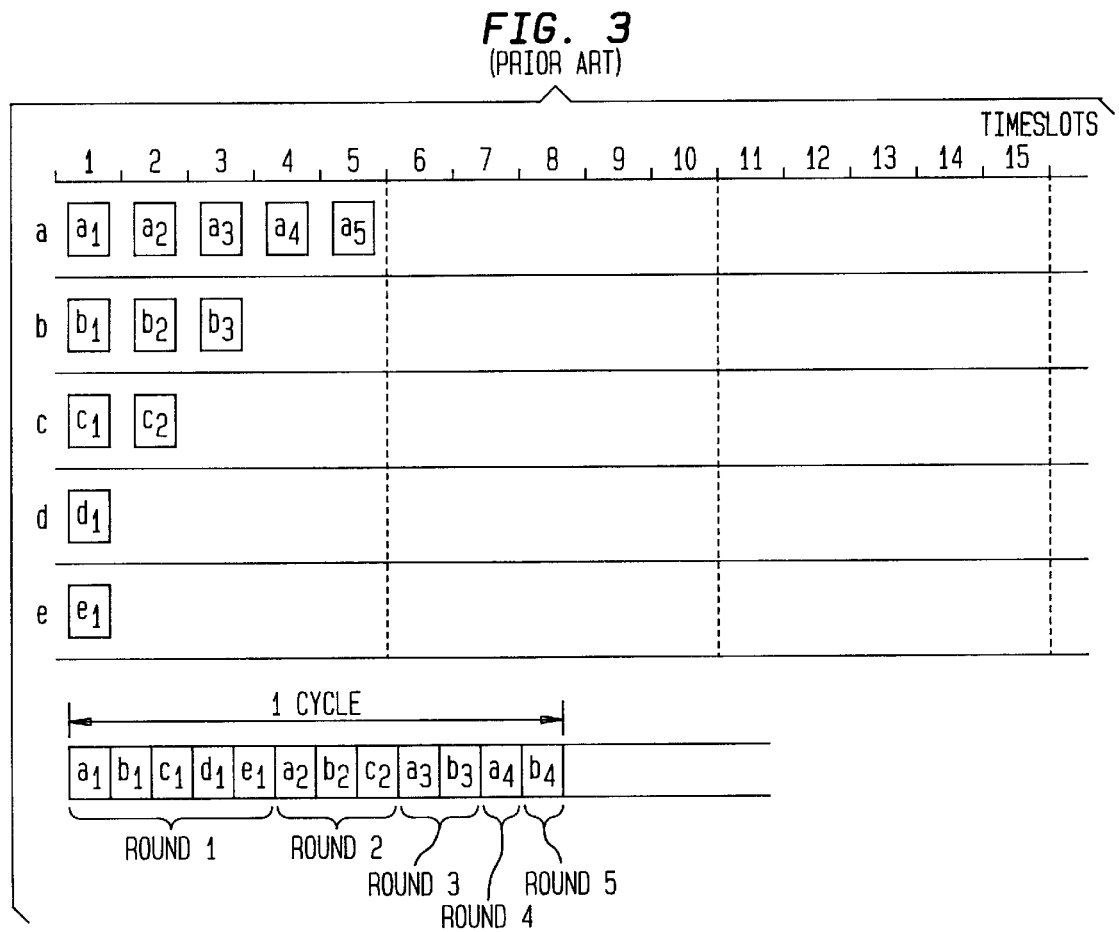
FIG. 3 illustrates a prior art WRR scheduling process.

As noted above, in performing cell layer multiplexing, devices of an ATM communications network must schedule the writing of cells into timeslots of the transmitted bitstreams. Illustratively, three types of sources may be accommodated by devices of the ATM network, namely, variable bit rate (VBR) sources, constant bit rate (CBR) sources and best effort sources.

According to the invention, the timeslots of the bitstream are organized into cycles which each contain a fixed length sequence of N timeslots, where N is an integer greater than 1. Each cycle is divided into at least one variable length round, wherein a round is a variable length subsequence of timeslots. The following nomenclature is used. Let n be the number of sources and i be an integral index for the sources from 1 to n. Let $s_i$, denote the $i^{th}$ source. Let $bm(s_i)$ be a mean cell production rate and $bm(s_i)$ be a peak cell production rate for the source $s_i$.

VBR sources are presumed to produce cells at a nominal mean rate of $bm(s_i)$ cells per cycle. However, a VBR source can produce as many as a peak rate $bp(s_i)$ cells per cycle. CBR sources are presumed to produce cells at a mean rate of $bm(s_i)$ cells per cycle. Both VBR and CBR sources have quality of service requirements; all cells produced during each cycle should be transmitted that cycle. On the other hand, best effort sources are not presumed to produce any specific number of cells per cycle. They have no quality of service requirement.

The scheduling process is stated as follows. Each source is presumed to produce cells during timeslots at random according to its quality of service. Those cells which are not assigned to, and written into, timeslots as soon as they are produced are presumed to be temporarily queued or dropped. Each $i^{th}$ source $s_i$ with a specific quality of service requirement (VBR or CBR source) is assigned a mean cell count $M_i$ and a peak cell count $P_i$. At the beginning of each cycle, the count $M_i$ for each $i^{th}$ cell source $s_i$ is set equal to the respective mean number of cells $bm(s_i)$ which can be produced by that $i^{th}$ cell source $s_i$ each cycle. In the case that the $i^{th}$ cell source $s_i$ is a VBR source, the count $P_i$ is set equal to the respective peak number of cells $bp(s_i)$ which can be produced by that $i^{th}$ cell source $s_i$ each cycle. In the case that the $i^{th}$ cell source $s_i$ is a CBR source, the count $P_i$ is set equal to the mean number of cells $bm(s_i)$ which the source $s_i$ produces each cycle.

The number of timeslots N per cycle is chosen to satisfy the following:

$$\sum_i bm(s_i) \leq N$$

That is, N must be at least equal to the sum of the mean rates of all CBR and VBR sources (the mean rate of a best effort source is zero). However, N need not be as big as the sum of all of the peak rates. In fact, a certain degree of statistical multiplexing gain G can be achieved if N is smaller. The multiplexing gain G is defined as:

$$G = \frac{\sum_i bp(s_i)}{N}$$

During each timeslot of a timeslot clock, a subset of the VBR and CBR sources is identified as described below. (The timeslot clock illustratively is synchronized to the timeslots of the outgoing bitstream into which the cells produced by the cell sources are to be written.) Successive rounds are formed for each timeslot. During each round, each source in the corresponding subset is "visited." That is, in a round robin fashion, the very next cell of each identified source is selected and sequentially assigned to (and written into) one of the timeslots of the round (to form the subsequence of cells of the round). Each time an $i^{th}$ VBR or CBR source is visited, the counts $M_i$ and $P_i$ are decreased by one (until zero is reached).

As noted above, at least one subset of VBR and CBR cell sources is identified each timeslot of the timeslot clock and corresponds to a sequential round. Each subset of VBR and CBR sources is visited during its corresponding round. The criterion for forming the subset is as follows. At the beginning of each timeslot of the timeslot clock, one of plural priority states is assigned to each cell source. These states are as follows:

state 1: $P_i > 0$, $M_i > 0$ and the $i^{th}$ cell source $s_i$ has a cell available for writing into a timeslot state 2: $P_i > 0$, $M_i \leq 0$ and the $i^{th}$ cell source $s_i$ has a cell available for writing into a timeslot state 3: Either ($P_i \leq 0$ and $M_i \leq 0$) or the $i^{th}$ cell source $s_i$ does not have a cell available for writing into a timeslot.

After assigning a priority state to each cell source, the highest priority state is identified. If the highest priority state is state 1, then a subset is formed with all of the cell sources with the priority state 1. If the highest priority state is state 2, then a subset is formed with all of the cell sources with the priority state 2. If the highest priority state is state 3 then no subset is formed. In the case that no subset is formed, one cell is selected from one of the best effort sources and assigned to (and written into) a timeslot. Illustratively, the best effort source is selected from amongst all of the best effort sources in a round robin fashion. This single best effort source cell forms the entire round.

Note also, that it is possible to assign priority state 1 to some cell sources and priority state 2 to others during the same timeslot of the timeslot clock. In such a case, a first round is formed from the subset of sources at priority state 1 and a second, successive round is formed from the subset of sources at priority state 2.

Intuitively, the above-noted process gives first priority to those cell sources for which less than the respective mean number of cells have been assigned to time slots (assuming that those cell sources have a cell available for assignment). Second priority is given to those cell sources for which a mean number of cells have been assigned a timeslot but less than the respective peak number of cells have been assigned a timeslot. Lowest priority is given to best effort sources.

Below is an illustrative pseudo code outline of a scheduling process according to an embodiment of the invention. In the pseudo code below, $S_0$ is the subset of best effort sources, $S_1$ is the subset of sources with state 1, $S_2$ is the subset of sources with state 2, $S_3$ is the subset of sources with state 3 and S' and $S'_0$ are temporary set variables.

Step 1: Let $P_i=bp(s_i)$ and $M_i=bm(s_i)$ for all $1 \leq i \leq n$
Step 2: Let $S_0=\{$best effort sources$\}$, $S_1=\{s_1,s_2, \ldots ,s_n\}-S_0$, $S_2=\emptyset$, $S_3=\emptyset$ and $S'_0=\emptyset$.
Step 3: i:=0, $S'_0=S_0$; move each source $s_k$ which does not have a cell available for assignment from $s_1$ to $S_3$; while (i<N) do

```
{
    if (S₁ ≠ φ)
    {
        S': = S₁;
        while (S' = φ) do
        {
            select a source sₖ from S';
            visit sₖ;
            S': = S'-sₖ; i+ +; Pₖ--; Mₖ--;
            check new state of sₖ;
            if (state transits to State 2) then
                move sₖ from S₁ to S₂;
            if (state transits to State 3) then
                move sₖ from S₁ to S₃;
        }
        goto round;
    }
    else if (S₂ ≠ φ)
    {
        S': = S₂;
        while (S' ≠ φ) do
        {   select a source sₖ from S';
            visit sₖ;
            S': = S'-sₖ; i+ +; Pₖ--;
            check new state of sₖ;
            if (state transits to State 2) then
                move sₖ from S₁ to S₂;
            if (state transits to State 3) then
                move sₖ from S₁ to S₃;
        }
        goto round;
    }
    else
    {
        select a best effort source sₖ from S';
        visit sₖ;
        S'₀: = S'₀-sₖ; i+ +;
    }
round:
    if (S'₀: = = φ) then S'₀: = S₀;
    check the new state of each source in S₃ for next round;
}
```

Figure 4:
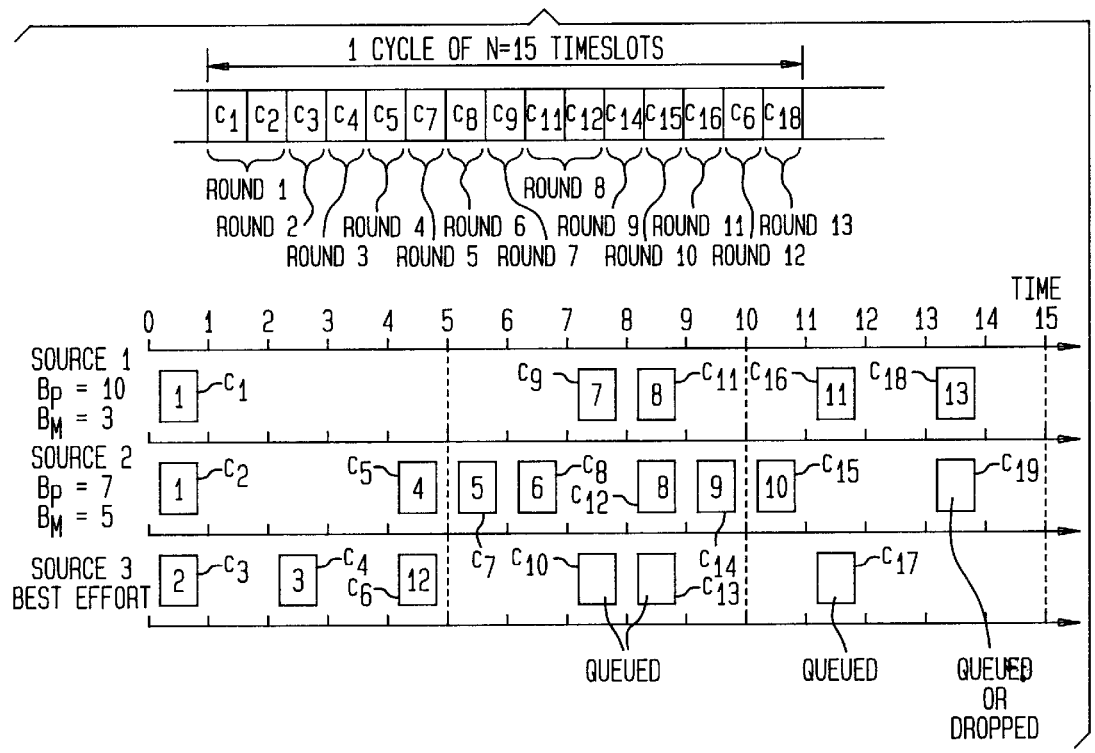
FIG. 4 illustrates a first example of a schedule produced by a scheduling process according to an embodiment of the present invention.

FIG. 4 shows a first example of scheduling using the above-noted process. Assume that sources $s_1$, and $s_2$ are VBR sources and source $s_3$ is a best effort source. Furthermore assume that each cycle has N=15 timeslots. Let the predefined mean cell production rates for $s_1$ and $s_2$ be $bm(s_1)=3$ and $bm(s_2)=5$. Let the predefined peak cell production rate for $s_1$ and $s_2$ be $bp(s_1)=10$ and $bp(s_2)=7$. Thus, the counts $P_i$ and $M_i$ for sources $s_1$ and $s_2$ are initialized as follows: $P_1=10$, $M_1=3$, $P_2=7$ and $P_2=5$. In FIG. 4, production of a cell is indicated by a rectangle on the line corresponding to the source which produced it at the respective position of the timeslot of production. The numeral in each rectangle denotes the round in which the cell is scheduled.

During timeslot T=1 of the timeslot clock, cells $c_1$, $c_2$ and $c_3$ are produced by the sources $s_1$, $s_2$ and $s_3$, respectively. Both VBR sources $s_1$ and $s_2$ have a cell available for assignment during timeslot T=1. Furthermore, both the mean and peak counts of both sources $s_1$ and $s_2$, namely, $P_1$, $M_1$, $P_2$ and $M_2$, are greater than zero. Thus, both sources $s_1$ and $s_2$ transition to state 1. State 1 is the highest state of all VBR and CBR sources. Therefore, round 1 is formed from cells $c_1$, and $c_2$ of sources $s_1$ and $s_2$ which are assigned to timeslots 1 and 2 of the outgoing bitstream. Furthermore, the counts $P_1$, $M_1$, $P_2$ and $M_2$ are decremented so that $P_1=9$, $M_1=2$, $P_2=6$ and $M_2=4$.

During timeslot T=2 of the timeslot clock, no cells are produced. Neither of the VBR sources $s_1$ and $s_2$ have a cell available. Thus, both sources $s_1$ and $s_2$ transition to the state 3. Since the highest state is 3, no subset is formed. Instead, round 2 is formed from one cell $c_3$ selected from the best effort source $s_3$ which is assigned to timeslot 3 of the outgoing bitstream.

During time slot T=3, cell $c_4$ is produced by the source $s_3$. For the reasons described above in regard to timeslot T=2, both VBR sources $s_1$ and $s_2$ remain in state 3. Therefore, round 3 is formed from the cell $c_4$ from the best effort source $s_3$ which is assigned to timeslot 4 of the outgoing bitstream.

During timeslot T=4, no cells are produced by any source $s_1$, $s_2$ or $s_3$ and none are available for assignment. No round is formed.

During timeslot T=5, cell $c_5$ is produced by source $s_2$ and cell $c_6$ is produced by source $s_3$. Source $s_1$ has no cell available during timeslot T=5 and remains in state 3. Source $s_2$ has a cell available. Furthermore, both the peak and mean counts of the source $s_2$, namely, $P_2$ and $M_2$, are greater than zero. Thus, source $s_2$ transitions to priority state 1. State 1 is the highest state. Round 4 is therefore formed from the cell $c_5$ which is assigned to timeslot 5 of the outgoing bitstream. Furthermore, the counts $P_2$ and $M_2$ are decremented so that $P_2=5$ and $M_2=3$.

During timeslot T=6, cell $c_7$ is produced by source $s_2$. Source $s_1$ has no cell available during timeslot T=6 and remains in state 3. Source $s_2$ has a cell available. Furthermore, both the peak and mean counts of the source $s_2$, namely, $P_2$ and $M_2$ are greater than zero. Thus, source $s_2$ remains in priority state 1. State 1 is the highest priority state. Round 5 is therefore formed from the cell $c_7$ which is assigned to timeslot 6 of the outgoing bitstream. Furthermore, the counts $P_2$ and $M_2$ are decremented so that $P_2=4$ and $M_2=2$.

During timeslot T=7, cell $c_8$ is produced by source $s_2$. Source $s_1$ has no cell available during timeslot T=7 and remains in state 3. Source $s_2$ has a cell available. Furthermore, both the peak and mean counts of the source $s_2$, namely, $P_2$ and $M_2$ are greater than zero. Thus, source $s_2$ remains in priority state 1. State 1 is the highest priority state. Round 6 is therefore formed from the cell $c_8$ which is assigned to timeslot 7 of the outgoing bitstream. Furthermore, the counts $P_2$ and $M_2$ are decremented so that $P_2=3$ and $M_2=1$.

During timeslot T=8, cell $c_9$ is produced by source $s_1$ and cell $c_{10}$ is produced by source $s_3$. Source $s_2$ has no cell available during timeslot T=8 and transitions to state 3. Source $s_1$ has a cell available. Furthermore, both the peak and mean counts of the source $s_1$, namely, $P_1$ and $M_1$ are greater than zero. Thus, source $s_1$ transitions to state 1. State 1 is the highest state. Round 7 is therefore formed from the cell $c_{10}$ which is assigned to timeslot 8 of the outgoing bitstream. Furthermore, the counts $P_1$ and $M_1$ are decremented so that $P_1=8$ and $M_1=1$.

During timeslot T=9, cell $c_{11}$ is produced by the source $s_1$, cell $c_{12}$ is produced by the source $s_2$ and cell $c_{13}$ is produced by the source $s_3$. Both sources $s_1$ and $s_2$ therefore have a cell available for assignment. Furthermore, both the mean and peak counts of both sources $s_1$ and $s_2$, namely, $P_1$, $M_1$, $P_2$ and $M_2$ are greater than zero. Thus, both sources $s_1$ and $s_2$ transition to state 1. State 1 is the highest state of all VBR and CBR sources. Therefore, round 8 is formed from cells $c_{11}$, and $c_{12}$ of sources $s_1$ and $s_2$ which are assigned to timeslots 9 and 10 of the outgoing bitstream. Furthermore, the counts $P_1$, $M_1$, $P_2$ and $M_2$ are decremented so that $P_1=7$, $M_1=0$, $P_2=2$ and $M_2=0$.

During timeslot T=10, cell $c_{14}$ is produced by the source $s_2$. Source $s_2$ has a cell available for assignment but source $s_1$ does not. The mean count $M_2$ of the source $s_2$ is not greater than zero but the peak count $P_2$ is greater than zero. Therefore, source $s_2$ transitions to state 2 and source $s_1$ transitions to state 3. State 2 is the highest state amongst all VBR and CBR sources $s_1$ and $s_2$. Therefore, round 9 is formed from cell $c_{14}$ which is assigned to timeslot 11 of the outgoing bitstream. Furthermore, the count $P_2$ is decremented so that $P_2=1$.

During timeslot T=11, cell $c_{15}$ is produced by the source $s_2$. Source $s_2$ has a cell available for assignment but source $s_1$ does not. The mean count $M_2$ of the source $s_2$ is not greater than zero but the peak count $P_2$ is greater than zero. Therefore, source $s_2$ remains in state 2 and source $s_1$ remains in state 3. State 2 is the highest state amongst all VBR and CBR sources $s_1$ and $s_2$. Therefore, round 10 is formed from cell $c_{15}$ which is assigned to timeslot 12 of the outgoing bitstream. Furthermore, the count $P_2$ is decremented so that $P_2=0$.

During timeslot T=12, cell $c_{16}$ is produced by source $s_1$ and cell $c_{17}$ is produced by source $s_3$. Source $s_2$ has no cell available during timeslot T=11. Furthermore, both $P_2$ and $M_2$ equal zero. Therefore, source $s_2$ transitions to the priority state 3. Source $s_1$ has a cell available. The mean count $M_1$ of the source $s_1$ is not greater than zero but the peak count $P_1$ of the source $s_1$ is greater than zero. Thus, source $s_1$ transitions to state 2. State 2 is the highest state. Round 11 is therefore formed from the cell $c_{16}$ which is assigned to timeslot 13 of the outgoing bitstream. Furthermore, the count $P_1$ is decremented so that $P_1=6$.

During timeslot T=13, no cells are produced by the sources $s_1$, $s_2$ and $s_3$. Furthermore, neither VBR source $s_1$ nor VBR source $s_2$ has any cell available for assignment. Thus, both sources $s_1$ and $s_2$ transition to state 3. No subset is formed from the VBR sources $s_1$ and $s_2$. However, the best effort source $s_3$ has a cell $c_6$ available for assignment. Therefore, round 12 is formed from cell $c_6$ of source $s_3$ which is assigned to timeslot 14 of the outgoing bitstream.

During timeslot T=14, cell $c_{18}$ is produced by the source $s_1$ and cell $c_{19}$ is produced by the source $s_2$. In the case of source $s_1$, $P_1$ is greater than 0 but $M_1$ equals 0. Therefore, source $s_1$ transitions to state 2. In the case of source $s_2$, both $P_2$ and $M_2$ equal 0. Therefore, source $s_2$ remains in state 3. The highest state is 2. Therefore, round 13 is formed from cell $c_{18}$ of source $s_1$ which is assigned to timeslot 15 of the outgoing bitstream. Peak count $P_1$ is also decremented so that $P_1=5$.

Note that cells produced by best effort sources which are not assigned to timeslots are queued in buffers of the sources. Note also that the cell $c_{19}$ produced by the source $s_2$ at timeslot T=14 is marked as queued or dropped. This cell $c_{19}$ is produced in excess of the peak number of cells predefined for this source. As a matter of policy, such excess cells may be stored in a buffer of the source $s_2$ for future cycles or discarded. Alternatively, to avoid such quality of service violations, traffic policing and flow regulation processes can be applied to the cells of the sources $s_1$ $s_2$ and $s_3$ before the sources are enabled for multiplexing into an outgoing bitstream. See C. Rosenberg & B. Lague, *A Heuristic Search for Source Policing in ATM Networks*, IEEE ACM TRANS. ON NETWORKING, vol. 2, no. 4, August 1994, p.387–97; X. Wu, I. Lambadaris, H. Lee & A. Kaye, *A Comparative Study of Some Leaky Bucket Network Access Schemes*, PROC. OF THE IEEE ICC 1994, May 1994, p.15865–91.

Figure 5:
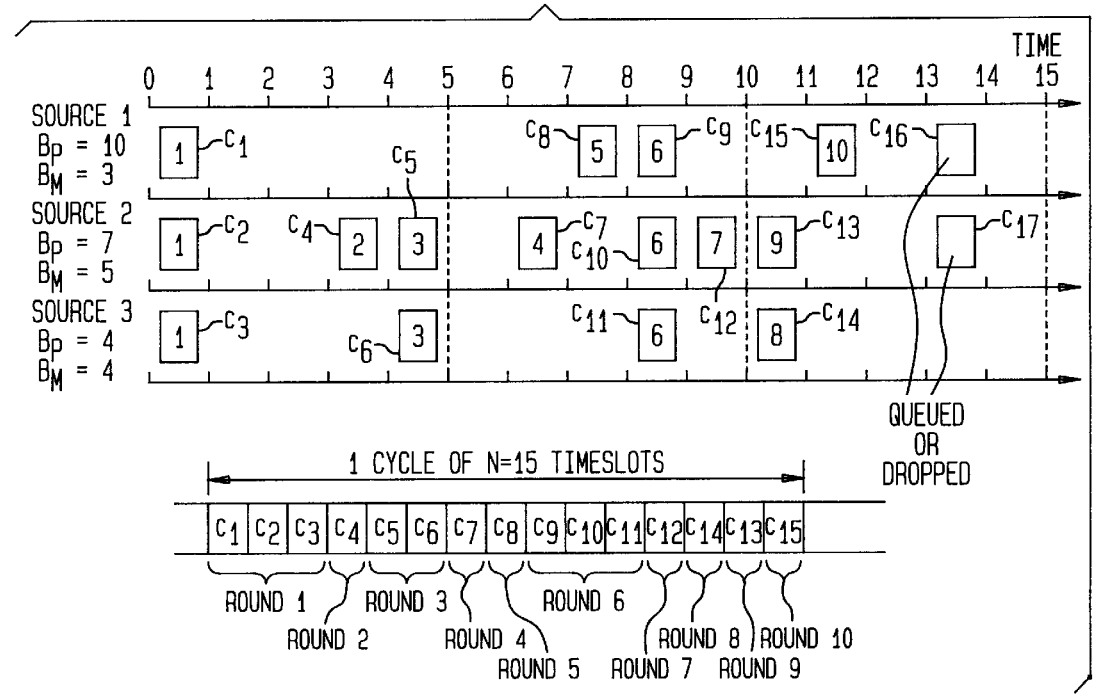
FIG. 5 illustrates a second example of a schedule produced by a scheduling process according to an embodiment of the present invention.

FIG. 5 illustrates a second example with two VBR sources $s_1$, $s_2$ and one CBR source $s_3$. Assume that the predefined mean and peak cell production rates are as follows: $bm(s_1)=3$, $bp(s_1)=10$, $bm(s_2)=5$, $bp(s_2)=7$, $bm(s_3)=4$. The count assignments are therefore as follows: $P_1=10$, $M_1=3$, $P_2=7$, $M_2=5$ and $P_3=M_3=4$.

At timeslot T=1, cells $c_1$, $c_2$ and $c_3$ are produced by the sources $s_1$, $s_2$ and $s_3$, respectively. Since each source $s_1$, $s_2$ and $s_3$ has a cell available for assignment, and since $P_1>0$, $M_1>0$, $P_2>0$, $M_2>0$, $P_3>0$ and $M_3>0$, all sources $s_1,s_2$ and $s_3$ transition to state 1. State 1 is the highest state. Therefore, round 1 is formed from cells $c_1$, $c_2$ and $c_3$ which are assigned to timeslots 1, 2 and 3 of the outgoing bitstream. Furthermore, the peak and mean counts $P_1$, $M_1$, $P_2$, $M_2$, $P_3$ and $M_3$ of each source $s_1$, $s_2$ and $s_3$ are decremented so that $P_1=9$, $M_1=2$, $P_2=6$, $M_2=4$ and $P_3=M_3=3$.

At timeslots T=2 and T=3 no cells are received and none are available for assignment. All sources $s_1$, $s_2$ and $s_3$ transition to state 3. Therefore, no round is formed.

At timeslot T=4, a cell $c_4$ is produced for source $s_2$. Furthermore, both $P_2$ and $M_2$ are greater than zero. Therefore, source $s_2$ transitions to state 1. Sources $s_1$ and $s_3$ have no cells available for assignment and therefore remain in state 3. State 1 is the highest state. Therefore, round 2 is formed from cell $c_4$ which is assigned to timeslot 4 of the outgoing bitstream. Furthermore, the peak and mean counts $P_2$ and $M_2$ of the source $s_2$ are decremented so that $P_2=5$ and $M_2=3$.

At timeslot T=5, cell $c_5$ is produced by the source $s_2$ and cell $c_6$ is produced by the source $s_3$. Furthermore, $P_2>0$, $M_2>0$, $P_3>0$ and $M_3>0$. Sources $s_2$ remains in the state 1 and source $s_3$ transitions to the state 1. Source $s_1$ remains in the state 3. State 1 is the highest state. Therefore, round 3 is formed from cells $c_5$ and $c_6$ which are assigned to timeslots 5 and 6 of the outgoing bitstream. Furthermore, the peak and mean counts $P_3$, $M_3$, $P_2$ and $M_2$ of the source $s_2$ are decremented so that $p_3=2$, $M_3=2$, $P_2=4$ and $M_2=2$.

At timeslot T=6 no cells are received and none are available for assignment. All sources $s_1$, $s_2$ and $s_3$ transition to state 3. Therefore, no round is formed.

At timeslot T=7, a cell $c_7$ is produced for source $s_2$. Furthermore, both $P_2$ and $M_2$ are greater than zero. Therefore, source $s_2$ transitions to state 1. Sources $s_1$ and $s_3$ have no cells available for assignment and therefore remain in state 3. State 1 is the highest state. Therefore, round 4 is formed from cell $c_7$ which is assigned to timeslot 7 of the outgoing bitstream. Furthermore, the peak and mean counts $P_2$ and $M_2$ of the source $s_2$ are decremented so that $P_2=3$ and $M_2=1$.

At timeslot T=8, a cell $c_8$ is produced for source $s_1$. Furthermore, both $P_1$ and $M_1$ are greater than zero. Therefore, source 51 transitions to state 1. Sources $s_3$ and $s_3$ have no cells available for assignment and therefore are in state 3. State 1 is the highest state. Therefore, round 5 is formed from cell $c_8$ which is assigned to timeslot 8 of the outgoing bitstream. Furthermore, the peak and mean counts $P_1$ and $M_1$ of the source $s_1$ are decremented so that $P_1=8$ and $M_1=1$.

At timeslot T=9, cells $c_9$, $c_{10}$ and $c_{11}$ are produced for sources $s_1$, $s_2$ and $s_3$, respectively. Since each source $s_1$, $s_2$ and $s_3$ has a cell available for assignment, and since $P_1>0$, $M_1>0$, $p_2>0$, $M_2>0$, $P_3>0$ and $M_3>0$, all sources $s_1$, $s_2$ and $s_3$ transition to state 1. State 1 is the highest state. Therefore, round 6 is formed from cells $c_9, c_{10}$ and $c_{11}$ which are assigned to timeslots 9, 10 and 11 of the outgoing bitstream. Furthermore, the peak and mean counts $P_1$, $M_1$, $P_2$, $M_2$, $P_3$ and $M_3$ of each source $s_1$, $s_2$ and $s_3$ are decremented so that $P_1=7$, $M_1=0$, $P_2=2$, $M_2=0$ and $P_3=M_3=1$.

At timeslot T=1, a cell $c_{12}$ is produced for source $s_2$. Mean count $M_2$ for source $s_2$ is not greater than zero, but peak count $P_2$ is greater than zero. Therefore, source $s_2$ transitions to state 2. Sources $s_1$ and $s_3$ have no cells available for assignment and therefore transition to state 3. State 2 is the highest state. Therefore, round 7 is formed from cell $c_{12}$ which is assigned to timeslot 12 of the outgoing bitstream. Furthermore, the peak count $P_2$ of the source $s_2$ is decremented so that $p_2 = 1$.

At timeslot T=11, cell $c_{13}$ is produced for source $s_2$ and cell $c_{14}$ is produced for source $s_3$. Source $s_2$ remains in state 2 for the reasons set forth above. Source $s_3$, however, transitions to state 1 because both $P_3$ and $M_3$ are greater than zero. Source $s_1$ remains in state 3. The highest state is 1. Therefore, round 8 is formed from cell $c_{14}$ which is assigned to timeslot 13 of the outgoing bitstream. Counts $P_3$ and $M_3$ are decremented so that $P_3 = M_3 = 0$. Thereafter, the highest state is 2. Thus, yet another round 9 is formed during timeslot T=11 from cell $c_{13}$ which is assigned to timeslot 14 of the outgoing bitstream. The count $P_2$ is decremented so that $P_2 = 0$.

At timeslot T=12, cell $c_{15}$ is produced for source $s_1$ which transitions to state 2. Both sources $s_2$ and $s_3$ transition to state 3 because they have no cells to assign or because both counts of each source are zero (i.e., $P_2 = M_2 = P_3 = M_3 = 0$). The highest state is state 2. Therefore, round 10 is formed from cell $c_{15}$ which is assigned to timeslot 15 of the outgoing bitstream. Count $P_1$ is decremented so that $P = 6$.

Note that in timeslot T=14, cells $c_{16}$ and $c_{17}$ are produced for sources $s_1$ and $s_2$. However, no more timeslots are available in the current cycle. Such extra cells may be queued or dropped depending on the policy of the scheduling process.

Figure 6:
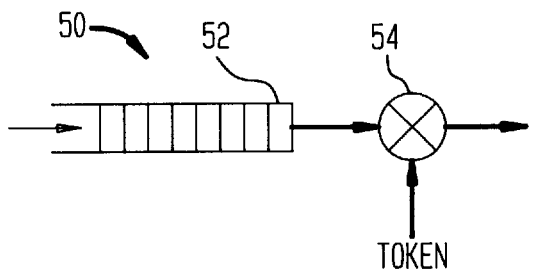
FIG. 6 depicts a conventional leaky bucket circuit.

The above process may be executed by any general purpose processor located in a device of the communications network 10. For example, in the case of a simple IBM™ compatible personal computer and modem operating as a CPE, an Intel™P5™ processor could be used. Advantageously, however, a specialized processor is provided according to an embodiment of the invention. The processor is based in part on the conventional leaky bucket circuit. FIG. 6 depicts a conventional leaky bucket circuit 50. Basically, cells arriving from a cell source are inputted to a queue or FIFO memory 52. A switch 54 is provided which receives the cells stored at the head of the FIFO 52. The switch 54 also receives a token control signal. In response to each token of the token control signal, the switch 54 outputs the cells from the head of the FIFO 52.

Figure 7:
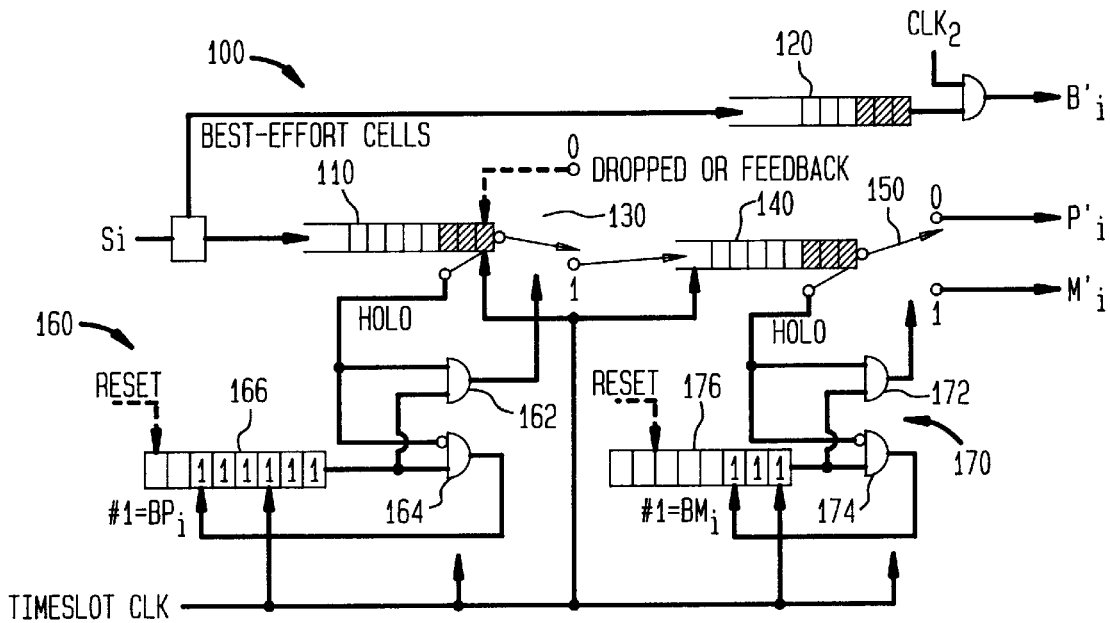
FIG. 7 depicts a dual leaky bucket scheduling cell input unit according to an embodiment of the present invention.

FIG. 7 depicts a cell input unit (CIU) 100 according to an embodiment of the present invention. The CIU 100 is a dual leaky bucket circuit. The purpose of the CIU 100 is to assign priority states to the cells produced by the source $s_i$. One CIU is provided for each $i^{th}$ source $s_i$. Cells are prioritized by directing the cells to one of three outputs labeled $B_i$ (best effort), $P_i$ (peak) or $M_i$ (mean). These outputs are in increasing order of priority. The cells outputted from each of the three outputs of each CIU 100 may then be assigned to timeslots according to the above process as further described below.

Cells received from a cell source $s_i$ are inputted to the tail of a FIFO 110 or a FIFO 120. Cells are outputted from the head of the FIFO 120 each timeslot of a timeslot clock (which may be synchronized to the timeslots of the outgoing bitstream), to an output labeled $B_i$ (best effort). A switch 130 is provided which outputs cells from the head of the FIFO 110 to either a first output 0 or a second output 1. Cells outputted to the output 0 may be either dropped or fed back to the FIFO 110. Cells outputted to the output 1 are received at the tail of another FIFO 140. A switch 150 is connected to the head of the FIFO 140. Cells are outputted by the switch 150 each timeslot of the timeslot clock to either a first output labeled $P_i$ (peak) or a second output labeled $M_i$ (mean).

Two token generator circuits 160 and 170 are provided for transmitting tokens to the switches 130 and 150, respectively. The token generator circuit 160 has two AND logic gates 162 and 164 and a shift register 166. In response to a reset signal, the shift register 166 loads a sequence of logic '1' bits. The length of the sequence of bits is equal to the predetermined peak number of cells $bp(s_i)$ which can be produced each cycle by the source si. In response to the timeslot clock, the shift register 166 shifts out one bit of the sequence per clock pulse. The bit shifted out by the shift register 166 is inputted to both AND gates 162 and 164.

Illustratively, the FIFO 110 outputs a Head Of Line Occupation (HOLO) signal indicating whether or not the FIFO 110 is empty. Illustratively, a logic '1' bit is outputted as the HOLO signal when the FIFO 110 is not empty and a logic '0' bit is outputted as the HOLO signal when the FIFO 110 is empty. The HOLO signal is inputted to the AND logic gate 162 and its complement is inputted to the AND logic gate 164. The output of the AND logic gate 162 is inputted as a token signal to the switch 130. When the token signal is a logic '0', the cell at the head of the FIFO 110 is outputted to output 0 (dropped or fed back). When the token signal is a logic '1', the cell at the head of the FIFO 110 is outputted to the output 1 (the FIFO 140). The output of the logic gate 164 is fed back to the shift register 166. The purpose of this feedback is to replenish any bits shifted out of the register 166 when the FIFO 110 is empty. In other words, the bits of the register 166 should only be shifted out when a cell is removed from the FIFO 110.

The token generator circuit 170 has two AND logic gates 172 and 174 and a shift register 176. In response to a reset signal, the shift register 176 loads a sequence of logic '1' bits. The length of the sequence of bits is equal to the predetermined mean number of cells $bm(s_i)$ which can be produced each cycle by the source si. In response to the timeslot clock, the shift register 176 shifts out one bit of the sequence per clock pulse. The bit shifted out by the shift register 176 is inputted to both AND gates 172 and 174.

Illustratively, the FIFO 140 outputs a Head Of Line Occupation (HOLO) signal indicating whether or not the FIFO 140 is empty. Illustratively, a logic '1' bit is outputted as the HOLO signal when the FIFO 140 is not empty and a logic '0' bit is outputted as the HOLO signal when the FIFO 140 is empty. The HOLO signal is inputted to the AND logic gate 172 and its complement is inputted to the AND logic gate 174. The output of the AND logic gate 172 is inputted as a token signal to the switch 150. When the token signal is a logic '0', the cell at the head of the FIFO 140 is outputted to output $P_i$. When the token signal is a logic '1', the cell at the head of the FIFO 140 is outputted to the output $M_i$ (the FIFO 140). The output of the logic gate 174 is fed back to the shift register 176. The purpose of this feedback is to replenish any bits shifted out of the register 176 when the FIFO 140 is empty. In other words, the bits of the register 176 should only be shifted out when a cell is removed from the FIFO 140.

Table 1 is truth table which governs the generation of the token generation circuits 160 and 170. In particular, the truth table explains when a token is generated and when a bit is fed back to the shift registers 166 or 176.

TABLE 1

| HOLO | bp or bm | HOLO · bp or bm | (~HOLO) · bp or bm | Description |
|---|---|---|---|---|
| 0 | 0 | 0 | 0 | Don't care |
| 0 | 1 | 0 | 1 | feedback bp or bm bit |
| 1 | 0 | 0 | 0 | Output cell to O/P$_i$ |
| 1 | 1 | 1 | 0 | Output cell to 1/B$_i$ |

In operation, if the source $s_i$ is a VBR or CBR source, the register 166 is initially reset to contain bp($s_i$) bits and the register 176 is reset to contain bm($s_i$) bits. The source $s_i$ outputs its cells to either the FIFO 110, if the source $s_i$ is a VBR or CBR source, or to the FIFO 120, if the source $s_i$ is a best effort source. Cells outputted to the FIFO 120 are outputted via best effort output $B_i$ to an output FIFO (described below) in synchronism with a clock CLK2.

Assume that the source $s_i$ is a CBR or VBR source. The cells are inputted to the FIFO 110. As soon as the first cell is inputted to the FIFO 110, the HOLO signal becomes a logic '1'. At this point, if less than bp($s_1$) cells have been transmitted this cycle, the token generator circuit 160 outputs a token which causes the switch 130 to output the cell at the head of the FIFO 110 to the tail of the FIFO 140. Note that the outputting of cells from the FIFO 110 is in synchronism with the timeslot clock since both the FIFOs 110 and 140 are synchronous circuits that are controlled by the timeslot clock. Note also that the shift register 166 shifts out one non-replenished bit for each cell shifted out of the FIFO 110.

In the case that the shift register 166 has depleted the sequence of bits therein, the cell shifted out of the FIFO 110 is outputted to output 0. Cells outputted to output 0 may either be discarded or fed back to the FIFO 110 depending on the scheduling policy implemented. This is a desirable event; the bits of the register 166 are depleted only when bp($s_i$) cells have already been assigned to timeslots during a current cycle. At such a point in time, it is desirable to restrict the source $s_i$ from outputting cells for assignment to timeslots of the outgoing bitstream.

Cells inputted to the FIFO 140 are shifted out by the switch 150 in synchronism with the timeslot clock. If the register 176 contains at least one bit, then less than the mean number of cells bm($s_i$) have been assigned to time slots. In such a case, a token signal of logic '1' is outputted to the switch 150. This causes the cell at the head of the FIFO 140 to be outputted via the output $M_i$. On the other hand, if all of the bits of the register 176 have been depleted, then more than the mean number of cells bm($s_i$) have been assigned to timeslots. If a cell is present in the FIFO 140 in such a case, then less than the peak number of cells bp($s_i$) have been assigned to timeslots. Thus, the cell is outputted via the output $P_i$.

Figure 8:
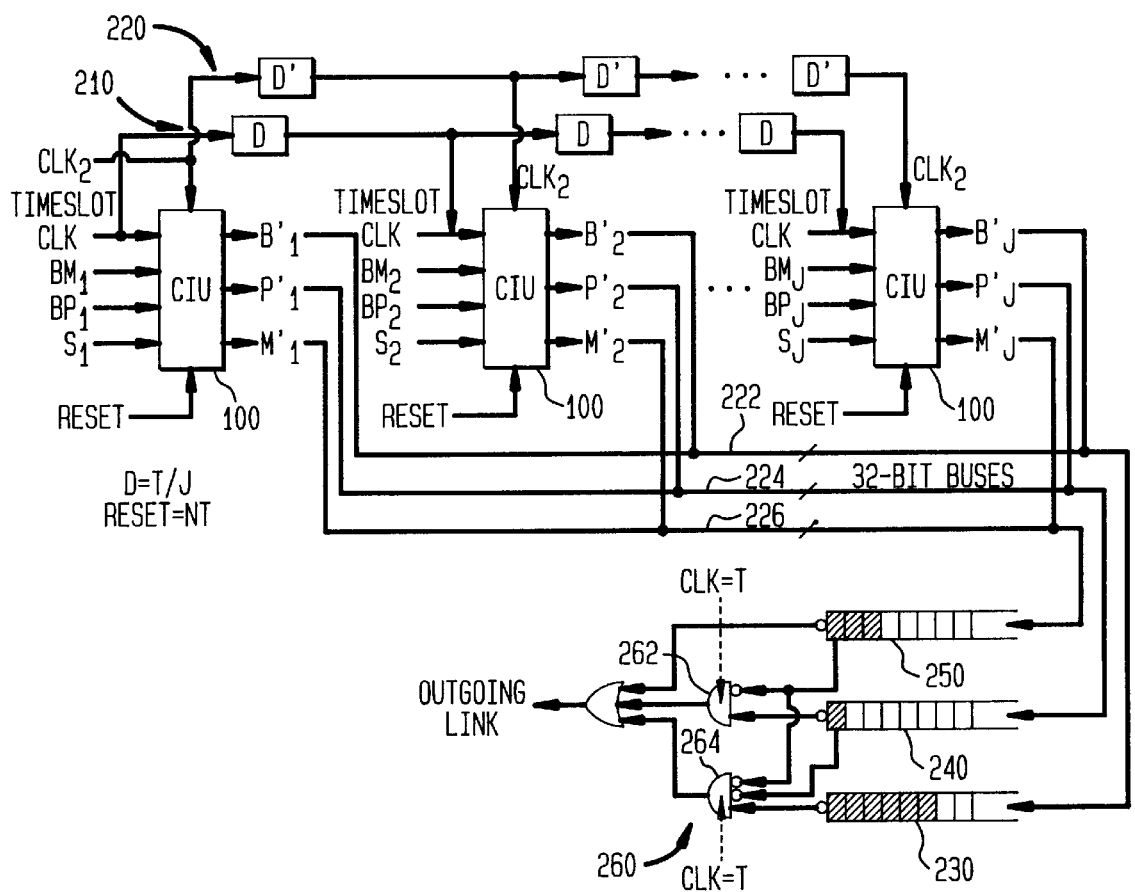
FIG. 8 depicts a scheduling processor formed with multiple cell input units of FIG. 7 according to an embodiment of the present invention.

FIG. 8 shows a processor 200 which has J>1 CIU's 100, including one $j^{th}$ CIU for each cell source $s_j$ for j=1 to J. As shown, a reset signal is provided each NT clocks, where N is the number of timeslots in each cycle and T is the duration of each timeslot. Each CIU 100 also receives respective predetermined peak and mean numbers of cells bp($s_i$) and bm($s_i$) for producing the sequence of bits in the registers 166 and 176 (FIG. 7). Two series of daisy chained delays 210 and 220 are provided. Each delay element of each of the delays 210 or 220 produces a delay period of T/J. The delays 210 are for delaying the timeslot clock. The delays 220 are for delaying the clock CLK2. Each $j^{th}$ CIU 100 receives the timeslot clock and CLK2 signal delayed by j periods of duration T/J. This delay enables the round-robin fashion of output, as described in greater detail below.

The best effort priority cells are outputted from each CIU 100 via a best effort cell bus 222 to an output FIFO 230. Likewise, the peak priority cells are outputted from each CIU 100 via a peak cell bus 224 to an output FIFO 240. Furthermore, the mean priority cells are outputted from each CIU 100 via a mean cell bus 226 to an output FIFO 250. Note, that the CIU's 100 are not intended to operate strictly synchronously and in parallel. Rather, the CIU's 100 are intended to operate contemporaneously and in series. This is ensured by delaying the timeslot and CLK2 clocks inputted to each $j^{th}$ CIU 100 by a respective j number of periods. Thus, only one cell is ever outputted onto the buses 222, 224 or 226 at one time.

As shown, a priority circuit 260 is provided for sequencing the outputting of cells from each of the output FIFOs 230, 240 and 250. The priority circuit illustratively includes an AND logic gate 262 and an AND logic gate 264. The AND logic gate 262 receives the complement of a HOLO signal outputted from the FIFO 250, the HOLO signal outputted from the FIFO 240 and a clock signal with a period of T. The AND logic gate 264 receives the complements of the HOLO signals outputted from the FIFOs 250 and 240, a HOLO signal outputted from the FIFO 230 and a clock with period JT. The AND logic gate 262 is disabled by the HOLO signal outputted from the FIFO 250. The AND logic gate 264 is disabled by either the HOLO signal outputted from the FIFO 250 or the HOLO signal outputted from the FIFO 240. Thus, if a cell is available in the FIFO 250, both of the FIFOs 240 and 230 are prevented from outputting their cells. If a cell is not available in the FIFO 250 but is available in the FIFO 240, the FIFO 230 is prevented from outputting cells. The purpose of the clock input to the gate 262 is to ensure that peak priority cells are not prematurely outputted until each CIU 100 has an opportunity to output mean priority cells. Likewise, the purpose of the clock input to the gate 264 is to ensure that best effort priority cells are not prematurely outputted until each CIU 100 has an opportunity to output mean or peak priority cells.

As noted each CIU 100 in the processor 200 is provided only T/J seconds to completely prioritize a cell. Assume a 155 Mbit/sec data rate, with a cell of length 64 bytes and 32 bit buses 222, 224 and 226. Each CIU 100 requires 64×8/32= 16 clocks to output each cell. If the clock period of each CIU 100 is c seconds and the number of sources is J then:

$$16 \cdot c \cdot J \leq 8 \cdot 64/155 \times 10^6$$

This requires that each CIU operate at about a 100 MHz clock for J =21 VBR and CBR sources. When multiplexing lower speed sources, e.g., 25.6 Mbit/sec, the number of VBR and CBR sources that can be supported by the processor 200 is J=120. However, the number of best effort sources which can be accommodated is unlimited since the CIU 100 utilizes an independent clock for best effort sources.

To evaluate the efficiency of the invention, a traffic model is utilized wherein each source is presumed to produce cells in bursts. Each burst during which cells are produced has a duration of $t_{on}$ and each interval between bursts has a duration $t_{off}$, where $t_{on}$ and $t_{off}$ are integer valued random variables. The expectation of the period duration is denoted $E[t_{on}]$ for a burst period and $E[t_{off}]$ for a period between bursts. Assume the arrival probability during a burst is determined by a Poisson random variable X with parameter λ, where $E[X]=\lambda$. Let ρ represent the utilization of the timeslot for a VBR source. Then:

$$\rho = \frac{\lambda E[t_{on}]}{E[t_{on}] + E[t_{off}]}$$

Given a cycle of length N and a VBR source with a peak rate $B_P$ and a mean rate $B_M$ then $$B_P = \lambda N, \text{ and}$$

$$B_M = \rho N = \frac{\lambda N E[t_{on}]}{E[t_{on}] + E[t_{off}]}$$

For CBR sources, the cell arrival probability in each timeslot is determined by a Poisson random variable $X_c$ with parameter $\lambda_c$, where $E[X_c]=\lambda_c$. Thus $$B_P = B_M = \lambda_c N$$

For best effort sources, the traffic is characterized by a message based model. In every timeslot, the message arrives according to a probability distribution function. Each message consists of a variable number of cells. If a message arrives, the message length is determined by a second random distribution function. The message arrival is assumed to be Poisson distributed with parameter $\lambda_{be}$ and the message length is exponentially distributed with a mean equal to ω.

In providing a comparison between the dynamically weighted round robin scheduling process according to the invention and the conventional weighted round robin scheduling, examples are provided using five sources with the following characteristics:

Source 1: VBR, $B_P=10$, $B_M=3$, $E[t_{on}]=15$, $E[t_{off}]=35$, λ=0.6667

Source 2: VBR, $B_P=7$, $B_M$32 5, $E[t_{on}]=15$, $E[t_{off}]=6$, λ=0.47

Source 3: Best effort, $\lambda_{be}=0.001, 0.002,...,0.009$, ω=30

Source 4: Best effort, $\lambda_{be}=0.001, 0.002,...,0.009$, ω=30

Source 5: Best effort, $\lambda_{be}=0.001, 0.002,...,0.009$, ω=30.

To obtain a fair comparison, three different weighing vectors ($W_1, W_2, W_3, W_4, W_5$) are utilized in WRR, where $W_1$ is the weight of source 1, $W_2$ is the weight of source 2, weight $W_3$ is the weight of source 3, $W_4$ is the weight of source 4 and $W_5$ is the weight of source 5. In a first weighing scheme, a peak weighing vector (10,7,1,1,1) is used. In a second weighing scheme, a mean weighing vector (3,5,1,1,1) is used. In a third weighing scheme, a uniform weighing vector (1,1,1,1,1) is used.

Figure 9:
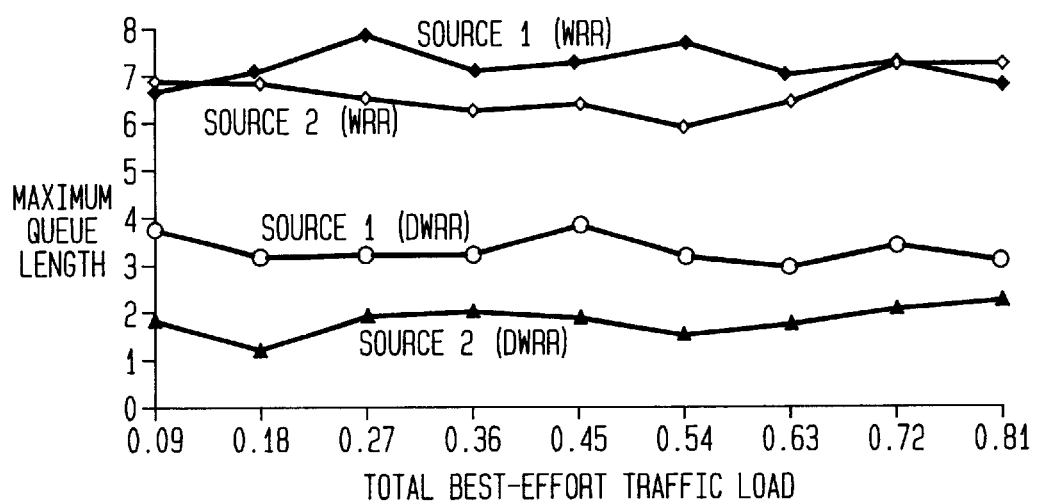
FIGS. 9–14 are graphs illustrating the reduction of buffer size of a process according to an embodiment of the present invention over the conventional WRR process.
Figure 10:
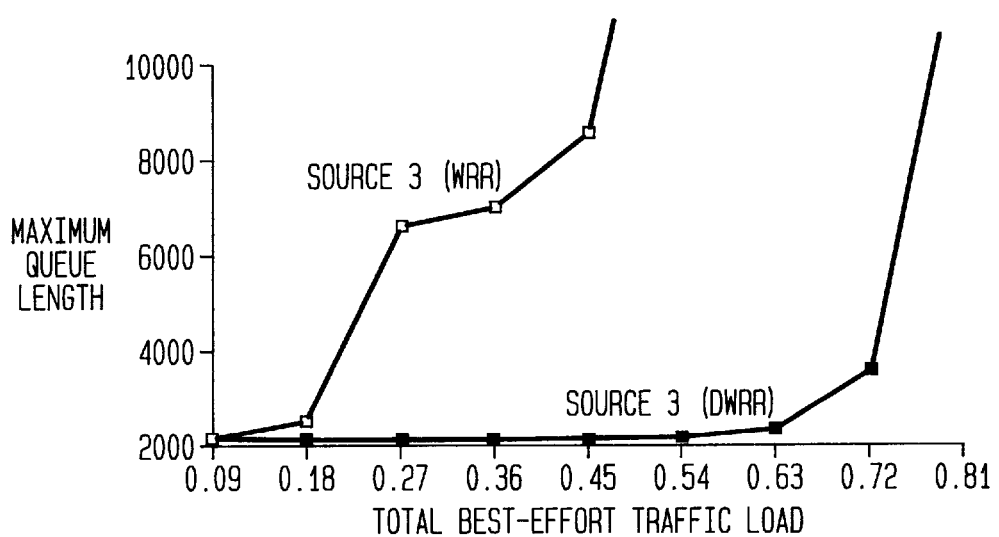

FIG. 9 depicts a comparison of maximum buffer sizes for sources 1 and 2, under WRR, using the peak weighing vector, and under the present invention (DWRR). FIG. 10 depicts a comparison of maximum buffer sizes for source 3 under WRR using the peak weighing vector and under the present invention (DWRR). In FIG. 9, both WRR and DWRR perform well. However, DWRR performs even better than WRR requiring smaller maximum buffer sizes. In FIG. 10, WRR does not perform as well as DWRR. Specifically, when best effort traffic reaches about 20% of the total traffic load, the maximum buffer size requirement grows rapidly. In contrast, maximum buffer size does not grow rapidly for DWRR until the best effort traffic reaches about 50% of the total traffic load.

Figure 12:
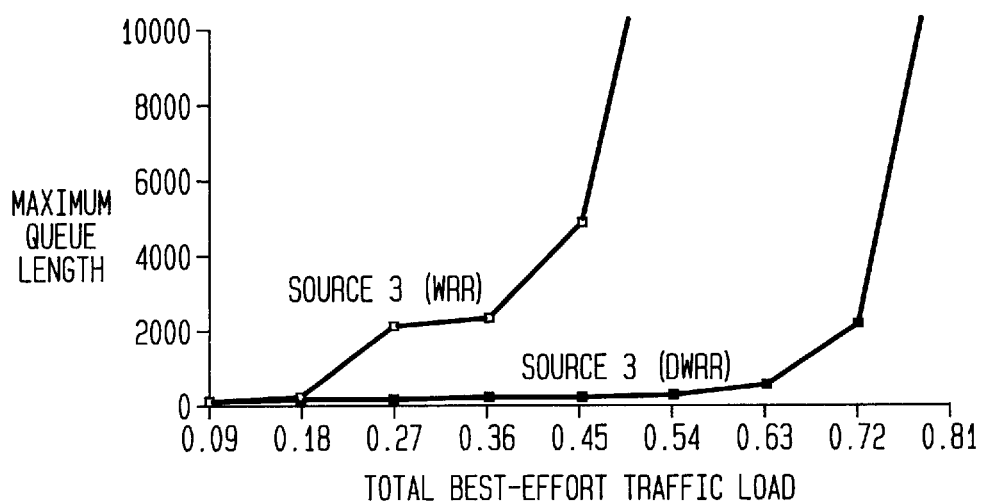
Figure 11:
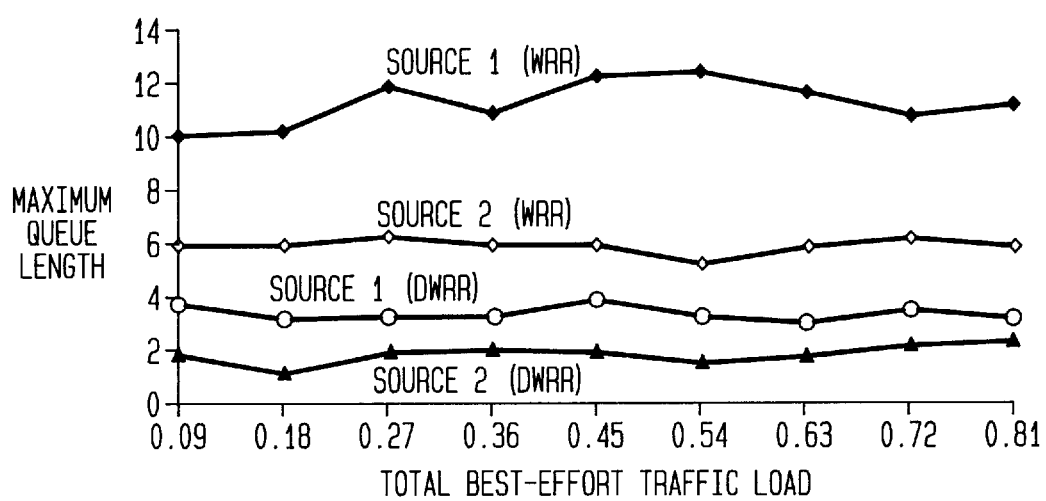

FIG. 11 compares the maximum buffer sizes of sources 1 and 2, under WRR using the mean weighting vector, and under the present invention. FIG. 12 compares the maximum buffer size of source 3, under WRR, using the mean weighting vector, and under the present invention. In FIG. 11, the maximum buffer sizes required for sources 1 and 2 under WRR are somewhat higher than in FIG. 9. In FIG. 12, the maximum buffer size for source 3 under WRR still grows rapidly at about 20% best effort traffic load although somewhat less rapidly than in FIG. 10.

Figure 13:
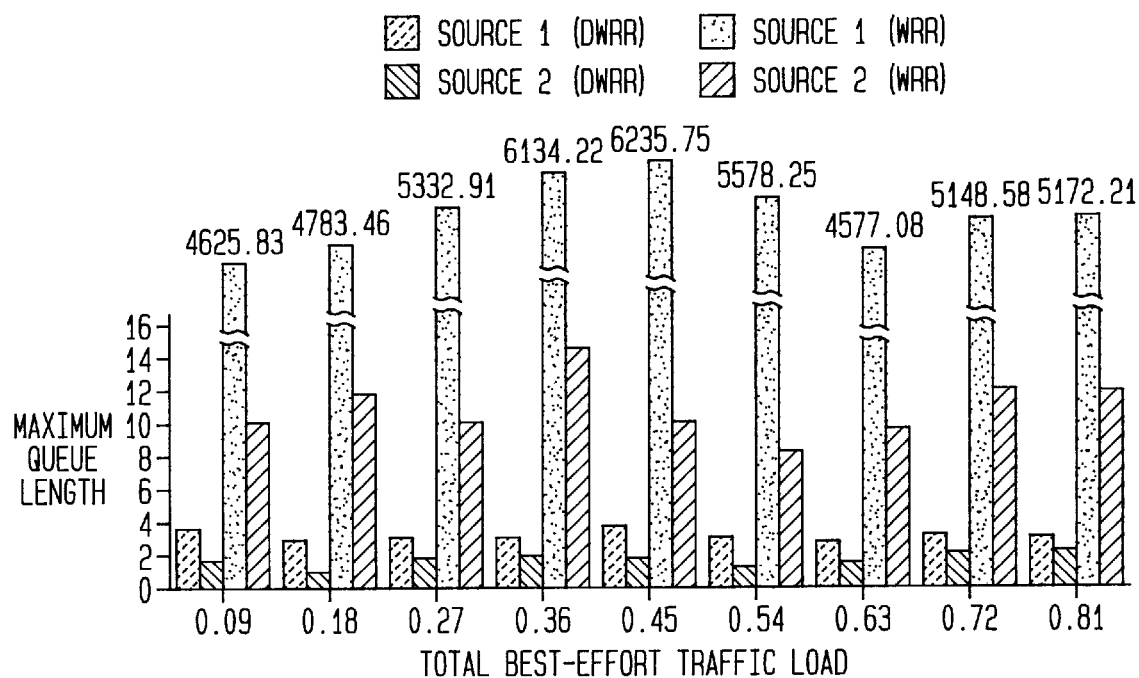
Figure 14:
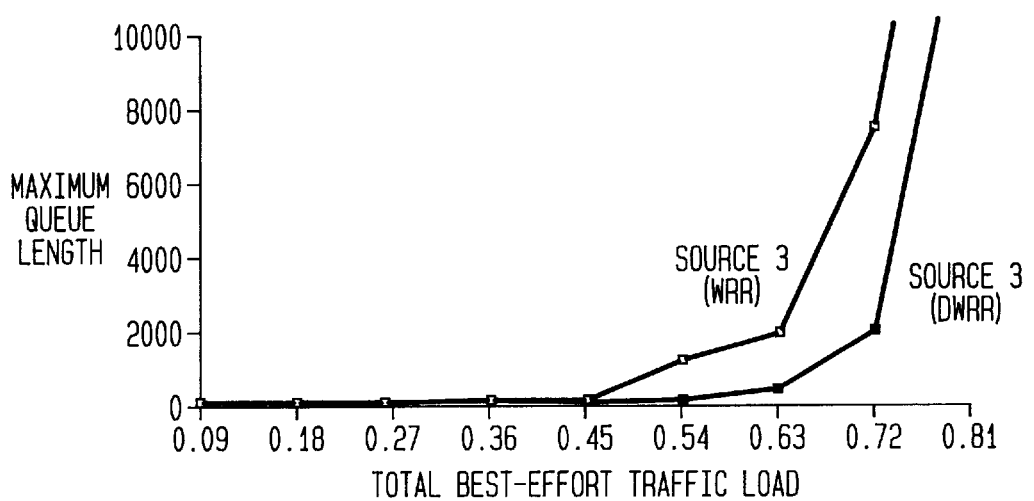

FIG. 13 and 14 compare maximum buffer sizes under WRR, and maximum buffer sizes under the present invention, where the uniform weighing vector is used in WRR. In FIG. 13, the maximum buffer sizes for sources 1 and 2 under WRR become very large. In FIG. 14, the maximum buffer sizes for source 3 under WRR approaches the maximum buffer size under the present invention. Nevertheless, the present invention sill out performs WRR.

In short, a dynamically weighted round robin process and apparatus are provided for scheduling the assignment of cells to timeslots in an ATM communication system. During each timeslot of a timeslot clock, one of plural priority states is assigned to each cell source. The assigned priority state depends on:

(1) whether or not the cell source has a cell available for assignment; and (2) how many cells of the particular source have been previously assigned to timeslots during the current cycle.

The highest priority assigned to a source is identified. One cell is selected in a round robin fashion from each source to which the highest priority is assigned. The selected cells are then assigned to sequential timeslots of a round.

Finally, the above description is merely illustrative of the invention. Numerous alternative embodiments may be devised by those having ordinary skill in the art without departing from the spirit and scope of the following claims.

The invention claim is:

1. A method for scheduling the assignment of cells from plural cell sources to timeslots of a bitstream outputted from a single output, where the bitstream is organized into plural cycles which cycles each comprises a fixed length sequence of N timeslots, where N is an integer greater than 1, said method comprising:

(a) dividing said N timeslot cycle into one or more variable sized rounds by:

(b) at the beginning of each round, dynamically assigning one of plural priority states to each one of said cell sources depending on the total number of cells of said cell source which have previously been assigned to timeslots in a current cycle, and whether or not said cell source has a cell available for assignment at the beginning of a given round, (c) during said given round selecting one cell from each source having a highest priority state, as compared to priority states assigned to other ones of said plural cell sources at the beginning of said given round, and (d) assigning said cells selected during said given round to a subsequence of said timeslots of said current cycle, said subsequence of timeslots forming one of said rounds.

2. The method of claim 1 wherein at least one of said plural cell sources is a variable bit rate cell source, and wherein said priority is assigned to each of said variable bit rate cell sources based on a predetermined mean number of cells which may be assigned during each cycle and predetermined peak number of cells which may be assigned during each cycle, which mean and peak numbers are assigned to said variable bit rate source.

3. The method of claim 1, wherein at least one of said cell sources is a variable bit rate cell source and wherein said step (b) further comprises, for each of said variable bit rate cell sources, the steps of:

assigning a first priority state to said variable bit rate cell source if said variable bit rate cell source has a cell available to transmit and less than said mean number of cells have been previously assigned during said current cycle, assigning a second priority state, lower than said first priority state, to said variable bit rate cell source, if said variable bit rate cell source has a cell available to transmit and at least said mean number, but less than said peak number, of cells have been previously assigned during said current cycle, and assigning a third priority state, lower than said second priority state, to said variable bit rate cell source otherwise.

4. The method of claim 1 wherein at least one of said plural cell sources is a constant bit rate source, and wherein said priority is assigned to each of said constant bit rate sources based on a predetermined assigned mean number of cells which may be assigned during each cycle, which mean number is assigned to said constant bit rate source.

5. The method of claim 4 wherein first, second and third priority states are available for assignment to cells, depending on the type of said cell source which produced said cells, in said step (b), and wherein said step (b) comprises, for each of said constant bit rate cell sources, the steps of:

assigning said first priority state to said constant bit rate cell source if said constant bit rate cell source has a cell available to transmit and less than said mean number of cells have been previously assigned during said current cycle, and assigning said third priority state, lower than said first and second priority states, to said constant bit rate cell source otherwise.

6. The method of claim 1 wherein at least one additional best effort cell source is provided, wherein said step (c) further comprises:

if each of said plural sources has a lowest priority state, transmitting a cell from one of said at least one additional best effort cell sources.

7. An apparatus for scheduling the transmission of cells from one or more cell sources in a bitstream outputted from a single output, where the bitstream is organized into plural cycles, which cycles each comprises a fixed length sequence of N cells, where N is an integer greater than 1, said apparatus comprising:

a processor configured to divide said N timeslot cycle into one or more variable length sized rounds by: at the beginning of each round, assigning one of plural priority states to each of said cell sources depending on the total number of cells of said cell source which have been previously assigned to timeslots in a current cycle, and whether or not said cell source has a cell available for assignment at the beginning of a given round, during said given round selecting one cell from each cell source having a highest priority state, as compared to priority states cell sources at the beginning of said given round, and assigning said cells selected during said given round to a subsequence of timeslots of said current cycle, said subsequence of timeslots forming one of said rounds.

8. The apparatus of claim 7 further comprising:

an input for receiving cells from said cell source.

9. A cell multiplexer, which receives one or more cells from one or more cell sources, for scheduling the transmission of cells from one or more cell sources in a bitstream outputted from a single output, where the bitstream is organized into plural cycles, which cycles each comprises a fixed length sequence of N cells, where N is an integer greater than 1, said cell multiplexer comprising:

a processor configured to divide said N timeslot cycle into one or more variable length sized rounds by: at the beginning of each round, assigning one of plural priority states to each of said cell sources depending on the total number of cells of said cell source which have previously been assigned in a current cycle, and whether or not said cell source has a cell available for assignment at the beginning of a given round, during said given round, selecting one cell, from said cell source if said cell source has a highest priority state, as compared to priority states assigned to other cell sources at the beginning of said given round, and assigning said cells selected during said given round to a subsequence of timeslots of said current cycle, said subsequence of timeslots forming one of said rounds.

10. The cell multiplexer of claim 9 further comprising:

an input for receiving cells from said cell source.

11. A switch in a communications network, for receiving one or more cells from one or more cell sources via one or more virtual circuits for transmission on one or more other virtual circuits, said switch also for scheduling the transmission of cells from one or more cell sources in each of one or more bitstreams, where a particular one of said bitstreams is outputted from a single output port and is organized into plural cycles, which cycles each comprises a fixed length sequence of N cells, where N is an integer greater than 1, said switch comprising:

a processor configured to divide said N timeslot cycle into one or more variable length sized rounds by: at the beginning of each round, assigning one of plural priority states to each of said cell sources depending on the total number of cells of said cell source which have previously been assigned to timeslots in a current cycle, and whether or not said cell source has a cell available for assignment at the beginning of a given round, during said given round, selecting one cell from said cell source if said cell source has a highest priority state, as compared to priority states assigned to other cell sources at the beginning of said given round, and assigning said cells selected during said given round to a subsequence of timeslots of said current cycle, said subsequence of timeslots forming one of said rounds.

12. The switch of claim 11 further comprising:

an input for receiving cells from said cell source.

13. A cell input unit for prioritizing cells for transmission in timeslots of a bitstream outputted from a single output, said bitstream being organized into plural cycles which cycles each comprises a fixed length sequence of N timeslots, where N is an integer greater than 1, comprising:

a first FIFO for receiving each cell from a cell source, a first token generator for detecting whether or not said first FIFO is empty, for generating a first token if said first FIFO is not empty and if less than a peak number of cells of said cell source have been previously assigned to a timeslot during a current cycle, a first switch, responsive to said first token and a timeslot clock, for outputting a cell from said FIFO only if said first token generator generates a first token for said cell, a second FIFO receiving only each cell outputted by said first switch and for which said first token generator generates a first token, a second token generator for detecting whether or not said second FIFO is empty, for generating a second token if said second FIFO is not empty and if less than a mean number of cells of said cell source have been previously assigned to a timeslot during said current cycle, and a second switch responsive to said timeslot clock for outputting a cell from said second FIFO via a first output in response to receiving said second token and for outputting said cell from said second FIFO to a second output otherwise, wherein each of said cycles is divided into plural variable sized rounds, each of said rounds comprising a sequence of timeslots, wherein cells outputted via said first output are assigned a higher priority than cells outputted via said second output, and wherein cells outputted from said first output are assigned to timeslots of different variable sized rounds, into which each cycle is divided than cells outputted from said second output.

14. A processor for scheduling plural cells for transmission from plural cell sources in timeslots of a bitstream outputted from a single output, said bitstream being organized into plural cycles which cycles each comprises a fixed length sequence of N timeslots, where N is an integer greater than 1, said processor comprising:

J cell input units, where J>1, including one cell input unit for receiving cells from a corresponding cell source, each $j^{th}$ cell input unit, for j=1 to J, receiving a timeslot clock that is delayed by j-1 periods, each of said cell input units, comprising:

a first FIFO for receiving each cell from said corresponding cell source, a first token generator for detecting whether or not said first FIFO is empty, for generating a first token if said first FIFO is not empty and if less than a peak number of cells of said cell source have been previously assigned to a timeslot during a current cycle, a first switch, responsive to said first token and said corresponding timeslot clock, for outputting a cell from said FIFO only if said first token generator generates a first token for said cell, a second FIFO receiving only each cell outputted by said first switch and for which said first token generator generates a first token, a second token generator for detecting whether or not said second FIFO is empty, for generating a second token if said second FIFO is not empty and if less than a mean number of cells of said cell source have been previously assigned to a timeslot during said current cycle, and a second switch responsive to said corresponding timeslot clock for outputting a cell from said second FIFO via a first output in response to receiving said second token and for outputting said cell from said second FIFO to a second output otherwise, a first output FIFO connected to said first outputs of each of said J cell input units, a second output FIFO connected to said second outputs of each of said J cell input units, and a priority circuit, for selecting said cells stored in said first output FIFO if said first output FIFO is not empty and for selecting said cells stored in said second FIFO if said first output FIFO is empty so as to dynamically divide each fixed length cycle into a plurality of variable sized rounds, each of said rounds including a sequence of timeslots assigned to each cell stored in only said first output FIFO, if said first output FIFO is not empty at the beginning of said round, and a sequence of timeslots assigned to each cell stored in only said second output FIFO, if said first FIFO is empty, but said second FIFO is not empty, at the beginning of said round.

* * * * *